United States Patent

[11] 3,543,871

| [72] | Inventor | Hermann Klaue<br>5 Brugierstrasse 775, Constance, Germany |
|---|---|---|
| [21] | Appl. No. | 718,869 |
| [22] | Filed | April 4, 1968 |
| [45] | Patented | Dec. 1, 1970 |
| [32] | Priority | July 3, 1967 |
| [33] | | Germany |
| [31] | | No. K 62,709 |

[54] CONTROL MECHANISM FOR TRACKED VEHICLES
3 Claims, 7 Drawing Figs.

[52] U.S. Cl............................................. 180/6.7; 74/471
[51] Int. Cl....................................... B62d 11/06
[50] Field of Search.......................................... 180/6.7, 6.2, 77, 77(H); 74/471(XY); 192/3, 5(FP)

[56] References Cited
UNITED STATES PATENTS

| 2,975,851 | 3/1961 | Youmans et al. ............. | 180/77(11)UX |
|---|---|---|---|
| 3,044,589 | 7/1962 | Klave .......................... | 180/6.7X |
| 3,386,523 | 6/1968 | Ruhl............................ | 180/6.7X |

FOREIGN PATENTS

| 863,238 | 3/1961 | Great Britain................ | 180/6.7 |

OTHER REFERENCES

DAS 1,139,041, German printed application 11/1962, Christenson, 180-6.2, (2 shts. dwg.- 5pp. Spec.)

Primary Examiner— Benjamin Hersh
Assistant Examiner— John A. Pekar
Attorney— Larson and Taylor ABSTRACT: A control mechanism for a tracked vehicle such as a bulldozer has a single operating lever for controlling both the speed of the vehicle through the changing of gears and the steering of the vehicle. A longitudinal pivoting movement of the operating lever controls the movement of a gear-change control slide valve through a lever-mounted gear arrangement whereas a transverse pivoting movement of the lever controls the pressurization of a pair of steering control valves through a pair of oppositely disposed lever-mounted projections.

Patented Dec. 1, 1970
3,543,871
Sheet 1 of 4
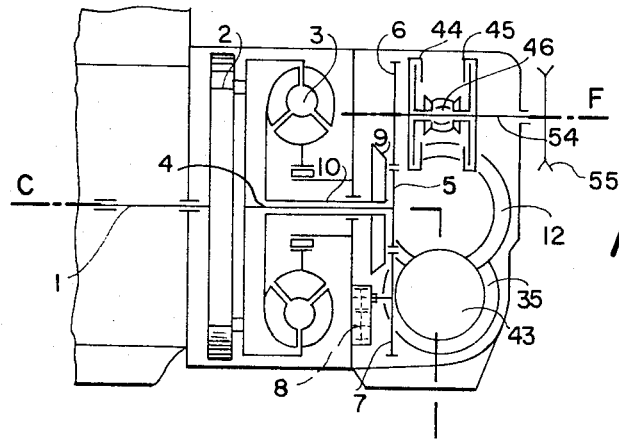
Fig. 1(A-B)
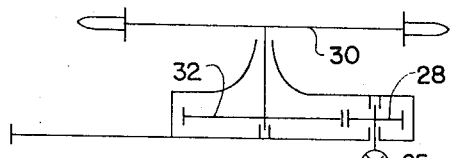
Fig. 3(E-F)
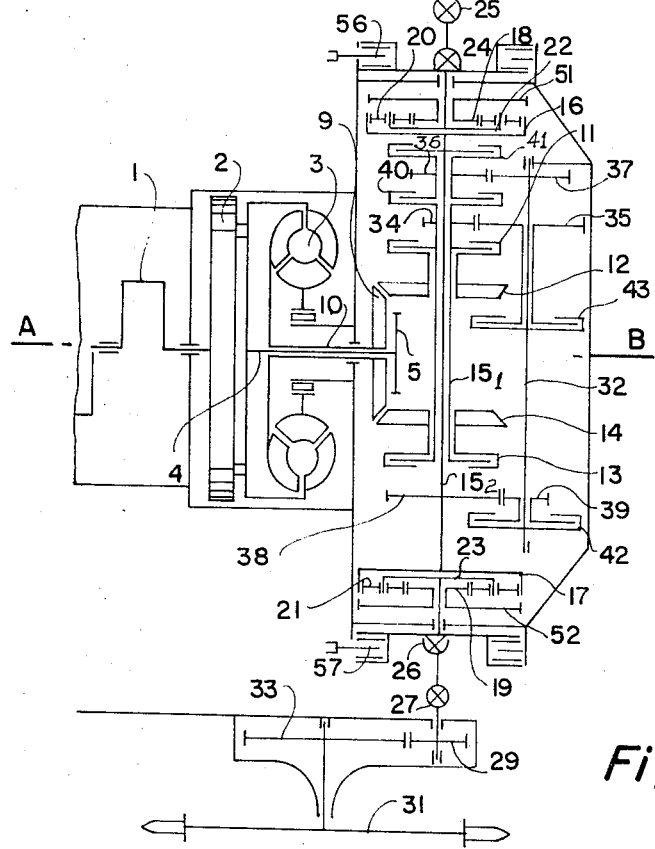
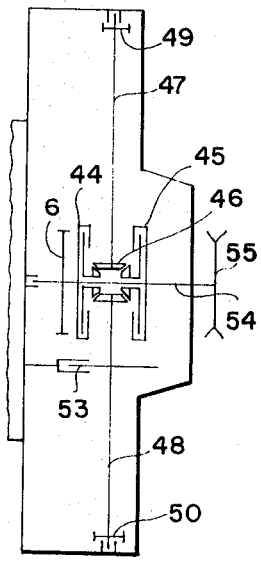
Fig. 2(C-D)
INVENTOR
HERMANN KLAUE
BY Larson and Taylor
ATTORNEYS

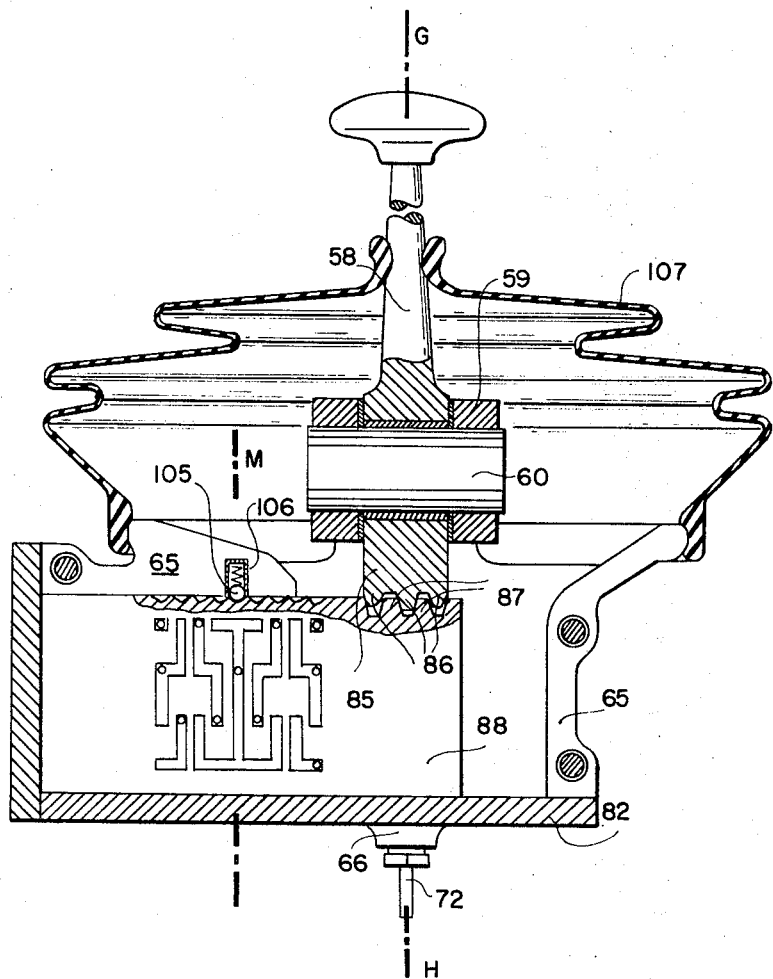

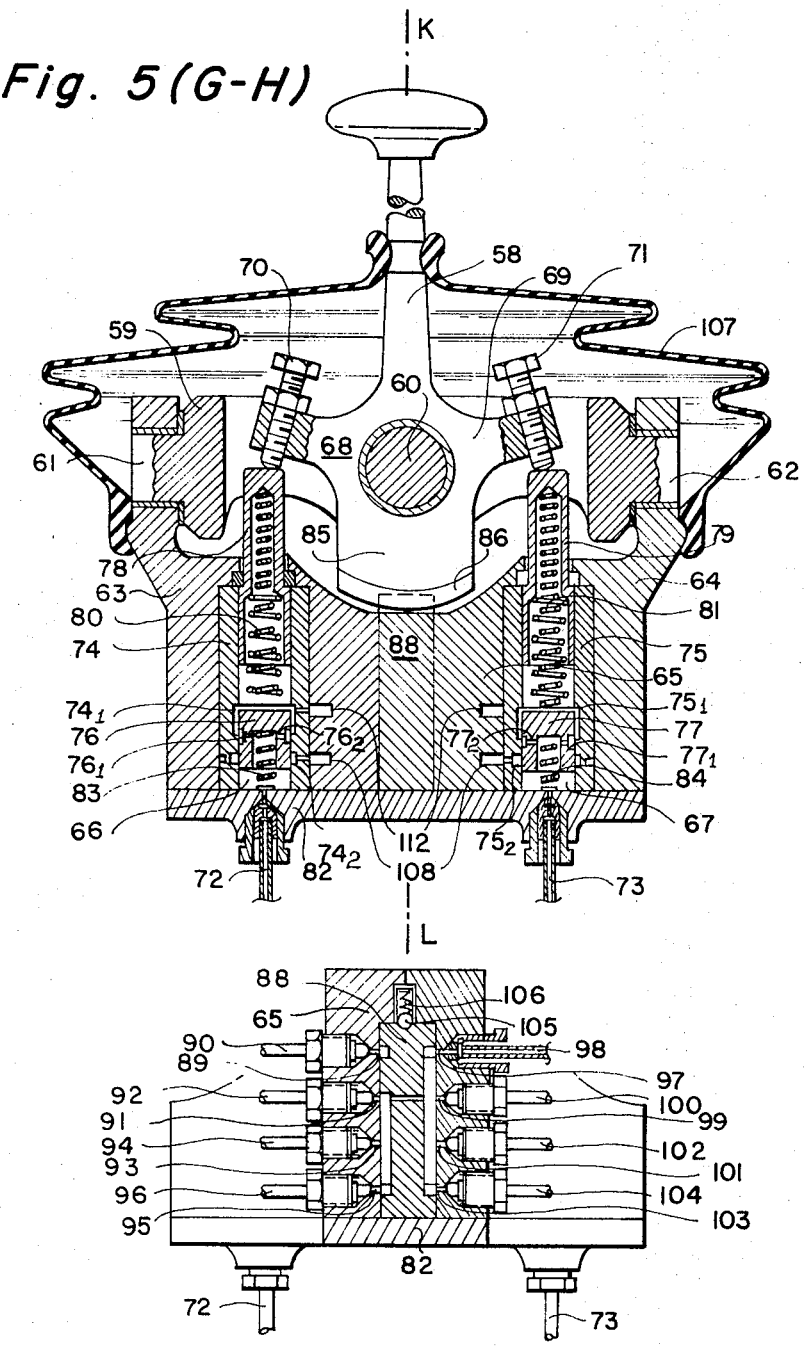

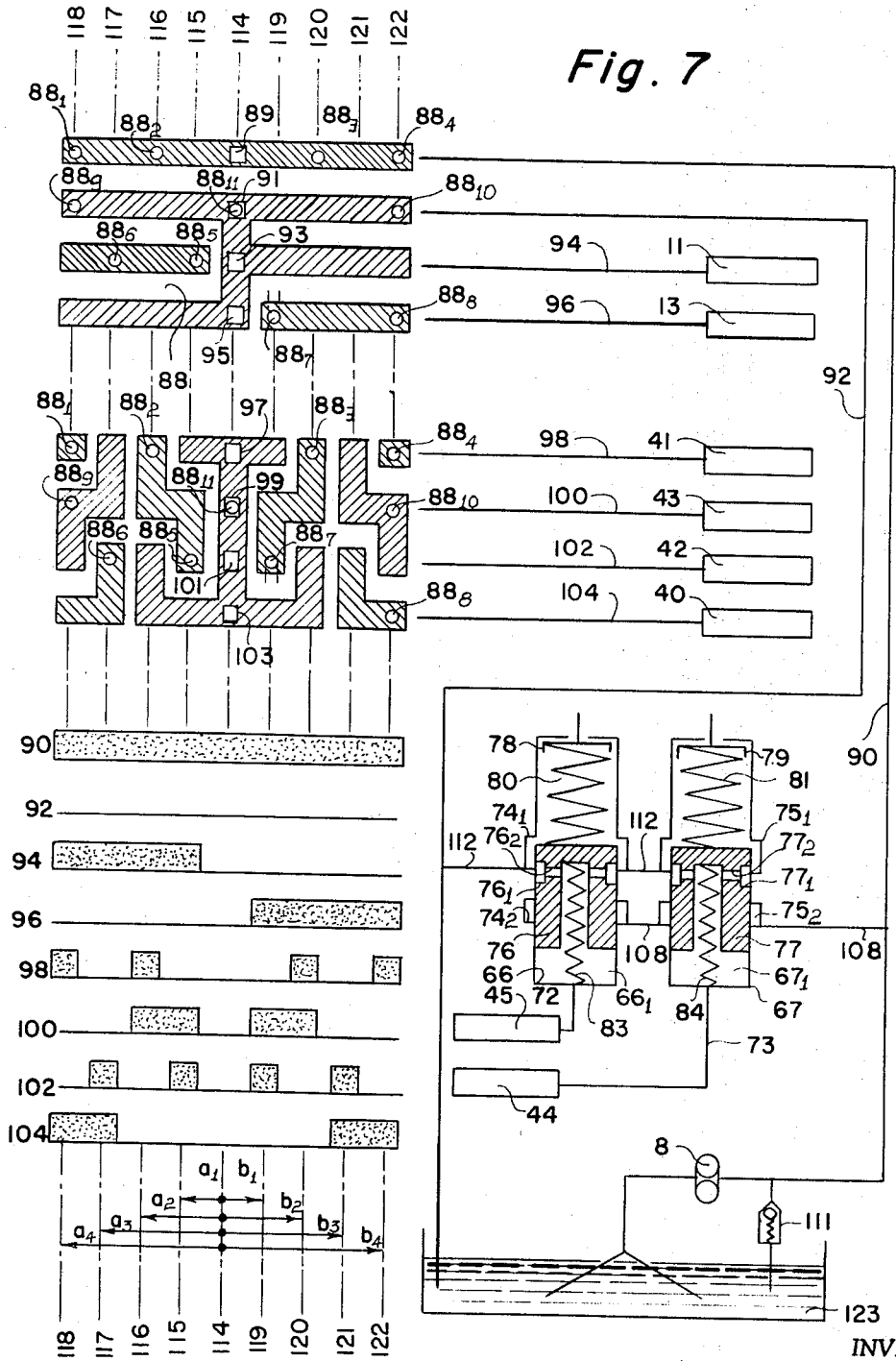

CONTROL MECHANISM FOR TRACKED VEHICLES

BACKGROUND OF THE INVENTION

1. Field of the Invention

The present invention relates to control mechanisms for tracked vehicles and more particularly to mechanisms for controlling steering and gear changing.

2. Description of The Prior Art

Tracked vehicles, and particularly those used in earth-moving such as bulldozers and the like, are generally equipped with a combination brake and clutch steering mechanism. In more recent years improved drives have been provided for tracked vehicles wherein the brake-clutch mechanism is controlled through a petalactuated hydraulic pump system. With this arrangement one hand of the driver is kept free and thus the driver is able to control the operation of whatever working tools the vehicle is equipped. There are a number of disadvantages to the clutch-brake combination steering mechanism, among which are the relatively poor steering provided thereby as well as the jerky, uneven movement of the vehicle occasioned by the use of such mechanisms. A further disadvantage is that with such a mechanism "on the spot" reversal of the direction of travel of the vehicle is unavailable.

A further tracked vehicle steering system which has been in existence for more than 20 years includes an epicyclic drive. Such systems may include a reversing gear driven by the steering drive shaft which permits on the spot reversal of the direction of travel. The control mechanisms for this latter system have not been entirely satisfactory in that these mechanisms are generally cumbersome because of the multilever control provided therefor and, in general, difficult to handle.

SUMMARY OF THE INVENTION

In accordance with the present invention a control mechanism for a system of the latter type discussed hereinabove is provided wherein a single operating lever controls both the speed of the vehicle through the changing of the gears and the direction of travel of the vehicle. The control mechanism of the invention while relatively inexpensive provides greater facility of operation particularly for vehicles of the earth-moving type.

In accordance with an important feature of the present invention the vehicle is made directly responsive to the movement of the operating lever and thus movement of the lever in a direction parallel to the longitudinal axis of the vehicle in a forward direction will cause forward movement of the vehicle while such a movement in a reverse direction will cause the vehicle to backup. Similarly a movement of the lever to the left, transverse to the longitudinal axis of the vehicle, will cause a corresponding movement of the vehicle to the left.

In accordance with a presently preferred embodiment of the invention the operating lever controls a hydraulic valve system which produces an automatic displacement of the vehicle in response to the position of the operating lever. The operating lever is mounted in a suspension system which permits pivoting of the lever in both longitudinal and transverse directions. Control of the transmission of power to the drive tracks is accomplished by movement of the operating lever in a direction parallel to the longitudinal axis of the vehicle which movement controls the movement of a hydraulic control slide valve. Steering is accomplished by transverse movements of the lever (for turning of the vehicle) through a pair of projections located on opposite sides thereof which control the oil pressure in a hydraulic clutch system. With this arrangement loss of pressure in the steering clutch system is prevented under circumstances where a change of gears takes place after the initiation of a steering movement.

A number of other features and advantages of the control mechanism of the present invention not specifically enumerated will become apparent to one skilled in the art upon consideration of the detailed description of the invention which is set forth herein below.

BRIEF DESCRIPTION OF THE DRAWINGS

The present invention can best be understood from the following description of the preferred embodiments taken with the accompanying drawings wherein:

FIG. 1 is a schematic representation of a presently preferred embodiment of the invention in longitudinal section taken generally along line A-B of FIG. 2;

FIG. 2 is a sectional view taken generally along line C-D of FIG. 1;

FIG. 3 is a further sectional view taken generally along line E-F of FIG. 1;

FIG. 4 is a detail view of a presently preferred embodiment of the steering and gear changing mechanism of the invention taken in longitudinal section generally along line K-L of FIG. 5;

FIG. 5 is a section view of the operating mechanism of FIG. 4 taken generally along line G-H;

FIG. 6 is a detail sectional view of a portion of the control mechanism of FIG. 4 taken generally along line M-N;

FIG. 7 is a schematic diagram of the control system including diagrams used in explaining the operation of the operating mechanism of FIGS. 1 to 6.

DESCRIPTION OF THE PREFERRED EMBODIMENT

Referring to FIGS. 1 to 3 the overall drive system of the present invention includes a crank shaft 1 connected to a flywheel 2 which in turn is connected to hydrodynamic drive mechanism generally denoted 3. A central shaft 4 which extends through the hydrodynamic drive 3 actuates, through associated spur gears 5 and 6, a series of steering clutches described hereinbelow. A further spur gear 7, which is geared to the centrally located drive gear 5, actuates an oil pump 8 (FIG. 1) which produces the oil pressure for the gear changing and steering gear mechanism as described hereinbelow. A bevel drive gear 9 is actuated by the hydrodynamic system 3 through a hollow shaft 10 concentric with central shaft 4. The desired turning direction of the vehicle is generated through a bevel gear 12 to a clutch 11 or through a bevel gear 14 to a clutch 13. The epicyclic drive includes a pair of sun gears 16 and 17 driven by a hollow shaft $15_1$ which is concentric with a main shaft $15_2$. When the vehicle is being driven in a straight line a pair of inner sun gears 18 and 19 are fixed and the engine drive is transmitted through a pair of pinions 28 and 29. Pinions 28, 29 are mounted on respective counter shafts on opposite sides of the vehicle and the engine drive is transmitted thereto through individual epicyclic gears 20 and 21, a pair of epicyclic bearings 22 and 23 and universal joints 24 and 25, and 26 and 27. The tracks or chains for the vehicle are driven by sprocket wheels 30 and 31 through spur gears 32 and 33 geared to pinions 28 and 29.

The gear changing portion of the drive system comprises three pairs of gears 34 and 35, 36 and 37, and 38 and 39, and four control clutches 40, 41, 42 and 43. Gear 34 is mounted on shaft $15_1$ and drives gear 35 which is mounted on a hollow shaft concentric with a shaft 32 parallel to shafts $15_1$, $15_2$. Gear 36 is similarly mounted on shaft $15_1$ and drives gear 37 mounted on shaft 32. Gear 38 is mounted on main shaft $15_2$ and drives gear 39 mounted on a further shaft concentric with shaft 32. Considering the operation of the gear shifting system, in first gear, clutches 42 and 43 are engaged thereby causing gears 34 and 38 to be driven by clutch controlled gears 35 and 39 respectively. In second gear clutches 43 and 41 are engaged and the drive is transmitted through gears 35 and 34 and gears 37 and 36. In third gear clutches 40 and 42 are engaged and the drive is transmitted through gears 36 and 37 and gears 39 and 38. In the direct fourth gear clutches 41 and 42 are engaged.

The steering drive which can best be seen in FIG. 3 is transmitted through steering driveshaft 54 which rotates continuously with the drive motor. Connection to the drive motor is made through a V-belt drive wheel 55 operatively connected to the drive motor through conventional V-belt means (not shown). Control of the direction of steering is accomplished through means of a pair of steering clutches 44 and 45 one of which, depending on the desired direction of travel, will be engaged to effect steering in that direction. Engagement of clutch 44 or 45 connects shaft 54, through a bevel gear arrangement 46, to a pair of oppositely rotating steering shafts 47 and 48 and a pair of associated pinions 49 and 50 to a pair of spur gears 51 and 52 (see FIG. 2) mounted coaxially with main shaft $15_2$. Spur gears 51 and 52 are geared respectively to inner sun gears 18 and 19 described hereinabove.

It is noted that a brake can be mounted on either of the secondary steering shafts 47 and 48 and with such an arrangement the brake must be unlocked before either of the steering clutches 45, 46 can be engaged. Thus with this arrangement straight line travel of the vehicle in the absence of engagement of the steering clutches 44, 45 is ensured. As can best be seen in FIG. 3 a tong brake arrangement denoted 53 is provided for steering shaft 48. For purposes of clarity it will be assumed throughout the specification that all brake locking arrangements are disengaged. It is noted that the drive system further includes a pair of disk brakes 56 and 57 (see FIG. 2) which operate externally of the gear housing and are utilized to provide braking of the vehicle.

The overall gear drive system described hereinbefore is of generally conventional construction and further description thereof is thought unnecessary.

Turning to FIGS. 4 to 7 and more particularly to FIGS. 4 and 5, in accordance with the present invention a single control or operating lever 58 is provided. Operating lever 58 is mounted such that both longitudinal and transverse movement thereof is permitted. The mounting for lever 58 includes a longitudinal cylindrical bolt 60 which extends through a longitudinal bore in the body of lever 58 and which is fixedly mounted in a frame member 59. Opposed portions of frame 59 form an opening for receiving the body portion of lever 58 and bore holes located in these opposed portions receive longitudinal bolt 50. With this arrangement lever 58 is permitted to be moved transversely in the opening provided by frame 59 by pivoting about the axis provided by bolt 60. Frame 59 is itself pivotably mounted to permit longitudinal movement of lever 58. Frame 59 includes a pair of cylindrical members 61 and 62 (FIG. 5) located on opposite ends thereof and adapted to be received in bearing portion 63 and 64 of a two-piece valve housing 65. As will be described hereinafter movement of the operating lever 58 in a forward or reverse longitudinal direction controls movement of the vehicle in a forward or reverse direction while movement of the operating lever to the right or left will cause movement of the vehicle to be right or left. It will be understood that the directions set forth are referenced to the longitudinal axis of the vehicle with the turning directions corresponding to those viewed by a driver facing in the forward direction. Movement of the lever from a neutral position to a reversing position will cause so-called "on the spot" turning of the vehicle in that the direction of movement of the drive track for the vehicle will be reversed.

Control of steering clutches 44 and 45 described hereinbefore is effected through control of first and second steering valves 66 and 67 (FIG. 5). Valves 66 and 67 themselves are controlled by first and second adjusting screws 70 and 71 which are mounted in bores in outwardly projecting portions 68 and 69 of operating lever 58. Screws 70 and 71 individually bear against first and second axially movable operating bushings 78 and 79 and it will be appreciated from FIG. 5 that, for example, movement of operating lever 58 to the left will cause screw 70 to bear against operating bushing 78 and cause longitudinal movement thereof. Bushings 78 and 79 are axially movable in respective bores in valve housing 65 and movement thereof controls the position of corresponding axially movable first and second slide valves 76 and 77. The steering control valves 66 and 67 further include first and second control springs 80 and 81 the upper ends of which are received in and bear against operating bushings 78 and 79, respectively, and the lower ends of which bear against the upper surfaces of slide valve 76 and 77, respectively. First and second counter springs 83 and 84 are positioned between the undersurfaces of slide valves 76 and 77, respectively, and the upper surface of a valve housing support plate 82. Pressure to steering control valves 66 and 67 is furnished through first and second pressure control lines 72 and 73. The operation of control valves 66 and 67 can best be understood upon consideration of FIG. 7 and this operation will be described in some detail hereinbelow.

Operating lever 58 further includes a downwardly depending projection 85 which extends outwardly of frame 59. Projection 85 is provided with a tooth arrangement 86 formed in the shape of an arc of a circle. Tooth arrangement 86 engages a flat tooth arrangement 86 formed in the flat upper surface of a longitudinally movable slide valve 88. Slide valve 88 controls operation of the gear shifting mechanism and as viewed in FIG. 4 movement of operating lever 58 from the neutral position in a clockwise direction will cause shifting into the forward gears while movement of operating lever 58 in the counterclockwise direction will cause corresponding shifting into the reverse gears. As can best be seen in FIG. 6 slide valve 88 includes a number of channels adapted to communicate with a series of boreholes formed in opposing portions of valve housing 65. The specific arrangement of these channels is illustrated in FIG. 7 and is discussed hereinbelow in connection with that FIG. The boreholes 89, 91, 93, 95, 97, 99, 101 and 103 communicate with the clutch arrangements described above as well as with various supply lines. Specifically, as can best be seen in FIG. 6, borehole 89 and associated conduit 90 supply pressurized oil from the main oil pump 8 described hereinbefore. Borehole 91 and associated conduit 92 provide drainage of oil from the disengaged clutches back to an oil sump 123 (see FIG. 7). Borehole 93 and associated conduit 94 are connected to the forward clutch 11 while borehole 95 and associated conduit 96 are connected to the reverse clutch 13. Borehole 97, which (together with boreholes 99, 101, and 103) is arranged on the opposite side of slide valve 88 to the boreholes described hereinabove, cooperates with associated conduit 98 connect slide valve 88 with gear shifting control clutch 41. Similarly borehole 99 and associated conduit 100 and borehole 103 and associated conduit 104 connect slide valve 88 with gear shifting control clutches 42 and 40, respectively. These connections are represented schematically in FIG. 7.

A detent mechanism which includes a ball detent 105 and a biasing spring 106 determines the longitudinal position of slide valve 88 under the control of operating lever 58. The valve housing further includes a resilient packing 107 which is sealably secured to upper portions of valve housing 65 and to the periphery of operating lever 58.

Operation of the steering and gear changing control mechanism of the present invention can be best understood from a consideration of the schematic diagram of FIG. 7. The system includes an oil sump 123 from which oil is sucked by pump 8 to be transmitted through conduit 90 to sleeve valve 88 and through conduit 108 to first and second annular chambers 109 and 110 in control valves 66 and 67, respectivly. A pressure release valve 111 provides a reduction in pressure when a predetermined level is exceeded.

To aid in understanding the functioning steering control mechanism the operation of the mechanism for a left turn will be considered. A left turn command is effected by movement of operating lever 58 in a clockwise direction as shown, it being noted that the movement is clockwise because FIG. 7 is a cross section taken in a direction opposite to the direction of forward motion of the vehicle. Clockwise movement of operating lever 58 causes operating bushing 79 to move axially downward. This movement of bushing 79 causes, through intervening spring 81, a corresponding movement in slide valve 77 such that the upper leading edge of an annular channel $77_1$ formed therein will pass over the lower leading edge of an annular channel $75_1$ which is in communication with conduit 112. Annular channel $77_1$ communicates, through boreholes $77_2$ with an oil pressure control chamber $67_1$ located at the lower end of valve 67 and thus the above described movement of slide valve 77 permits communication between chamber 67₁ and oil sump 123. As the pressure on control spring 81 increases slide valve 77 will move axially downward to a position where the lower leading edge of annular chamber 77₁ passes over the upper leading edge of a second annular channel 75₂. Channel 75₂ is provided with oil under pressure by means of conduit 108 and thus there will be an oil pressure increase, communicated by boreholes 77₂, in control chamber 67 and thus in steering clutch 44 which is in communication therewith. It is noted that the oil pressure provided is equal to the difference between the tension on springs 81 and 84 divided by the surface area of slide valve 77. The leading edges of annular channel 77₁ are adapted to move between positions adjacent the lower leading edge of upper annular channel 75₁ and the upper leading edge of annular channel 75₂. A further clockwise movement of operating lever 58 against the bias of control springs 81 and 84 will cause a further pressure increase in control chamber 67 to cause actuation of clutch 44. As described hereinabove with clutch 44 engaged the engine drive torque will be transmitted to inner sun wheel 18 to cause leftward motion of the vehicle.

It will be appreciated that counterclockwise movement of operating lever 58 will cause actuation of inner sun gear 19 through a similar procedure. Counterclockwise movement of operating lever 58 causes a similar downward movement in slide valve 67 which connects pump 8 to clutch 45 and causes disengagement of clutch 44 through release of pressure in valve 67. It is noted that release of operating lever 58 during steering will cause lever 58 to return automatically to the neutral position thereof. Movement of lever 58 to the neutral position releases both clutches 44 and 45 and thus depending upon the longitudinal position of operating lever 58 the vehicle will stop or continue to move in a straight line.

The upper left hand portion of FIG. 7 illustrates an exemplary arrangement of the guiding channels formed in the opposed surfaces of slide valve 88. The uppermost diagram represents the channels on the left side of valve 88 as seen in FIG. 6 while those in the lowermost of the two diagrams represents the channels on the right hand side of valve 88 as viewed in that FIG. For purposes of clarity the channel arrangements are both viewed in the same direction of sight, and, further, channels which are connected to a source of oil under pressure are cross hatched from top left to bottom right while the channels connected to the oil sump 123 and thus provide drainage, are crosshatched from bottom left to top right. The channels formed in opposite surfaces of valve 88 which are under pressure are interconnected by a series of boreholes 88₁, 88₂, 88₃, 88₄, 88₅, 88₆, 88₇, and 88₈ as illustrated in FIG. 7. It will be noted that borehole 88₇ is arranged obliquely to the horizon while the remaining boreholes are horizontal. The drainage channels formed in opposite surfaces of valve 88 are interconnected by boreholes 88₉, 88₁₀, and 88₁₁.

Comparing the upper and lower left hand portions of FIG. 7 it will be seen that the dot-dash line 114 represents the neutral position of slide valve 88. Thus where slide valve 88 is shifted by a distance corresponding to the distance $a_1$ in FIG. 7 to a position where lines 114 and 115 coincide the first forward gear of the gearing system is actuated. Under these circumstances borehole 93 communicates with borehole 88₅ and a channel under pressure and thus pressure is furnished to forward clutch 11 whereas borehole 95 communicates with a drainage channel and thus reverse clutch 13 remains disengaged. The above described movement of sleeve valve 113 further causes boreholes 99 and 101 to communicate with the oil pressurized channel containing boreholes 88₂ and 88₅ and thus clutches 42 and 43 are pressurized through channels 102 and 100 respectively. Boreholes 97 and 103 communicate with a drainage channel and thus clutches 40 and 41 remain without pressure.

The consequences of further movement of slide valve 88 in either direction may be gleaned from the chart at the lower left hand portion of FIG. 7. The letters $a_1$, $a_2$, $a_3$ and $a_4$ correspond to the movement of slide valve 88 when actuating the four forward gears of the system with the lines denoted 115 to 118 indicating the position of slide valve 88 for the various gears. Similarly, the letters $b_1$, $b_1$, $b_3$ and $b_4$ correspond to the movement of slide valve 88 in actuating the four reverse gears and lines 119 to 122 indicate the respective positions of the valve corresponding to these gears. The pressure diagram in the lower left hand corner of FIG. 7 provides an indication of which conduits are furnished with oil under pressure, the blacked-in portions of the diagram denoting that pressure is being supplied. Thus it will be seen that conduit 94 which leads to the forward clutch 11 is furnished with oil under pressure for all forward movements of slide valve 88 and is without pressure for all reverse movements of that valve. The sequence of actuation of the gear changing clutches 40, 41, 42 and 43 corresponds to that described hereinabove in connection with FIGS. 1 to 3. Thus, for example, in third gear conduits 102 and 104 are furnished with oil under pressure and thus clutches 40 and 42 are engaged as described above.

It is noted that rectangularly shaped slide valve 88 may be replaced by a cylindrical valve. Similarly, slide valve 88 could be actuated by means mounted on operating lever 58 in other than the longitudinal direction thereof. Further, the steering torque may be transmitted through a hydrostatic drive system instead of through the clutch system described hereinbefore. With such an arrangement the operating lever would be moved transversely to the driving direction and the hydrostatic drive means would be regulated by an eccentric or swash-plate type adjustment.

Although the invention has been described in some detail with reference to a presently preferred embodiment thereof it will be understood that modifications other than those specifically enumerated may be effected without departing from the scope and spirit of the invention. Thus the scope of the invention is to be determined not from the illustrative embodiment described hereinbefore but rather from the subjoined claims.

Having thus described my invention in accordance with the requirements of the Patent Statutes.

I claim:

1. A control mechanism for a tracked vehicle comprising speed-changing control means and steering control means, a single operating lever for actuating both said speed-changing control means and said steering control means, epicyclic gear drive means mounted on both sides of said operating lever, hydrostatic clutch means for coupling said single operating lever to said epicyclic gear drive means, first and second rotatable steering shafts, and pinion means associated with said steering shafts for controlling the direction of the drive provided by said epicyclic gear drive means, said operating lever including first and second projections located on opposite sides thereof and said hydrostatic clutch means including first and second clutches for controlling the direction of rotation of said rotating shafts, said mechanism further including first and second projection-actuated valve means for selectively controlling said first and second clutches responsive to transverse movements of said operating lever.

2. A control mechanism as claimed in claim 1 further comprising a gimbal suspension for mounting said single operating lever, said suspension including a pivotable frame member open at the top thereof.

3. A control mechanism as claimed in claim 2 further comprising a gear tooth arrangement for interconnecting said single operating lever and said speed-changing control means, said gear tooth arrangement including gear means comprising a plurality of gear teeth formed in the shape of an arc of a circle.